J. B. DUMAIS.
STEERING WHEEL FOR AUTOMOBILES.
APPLICATION FILED SEPT. 28, 1907.
930,362.
Patented Aug. 10, 1909.
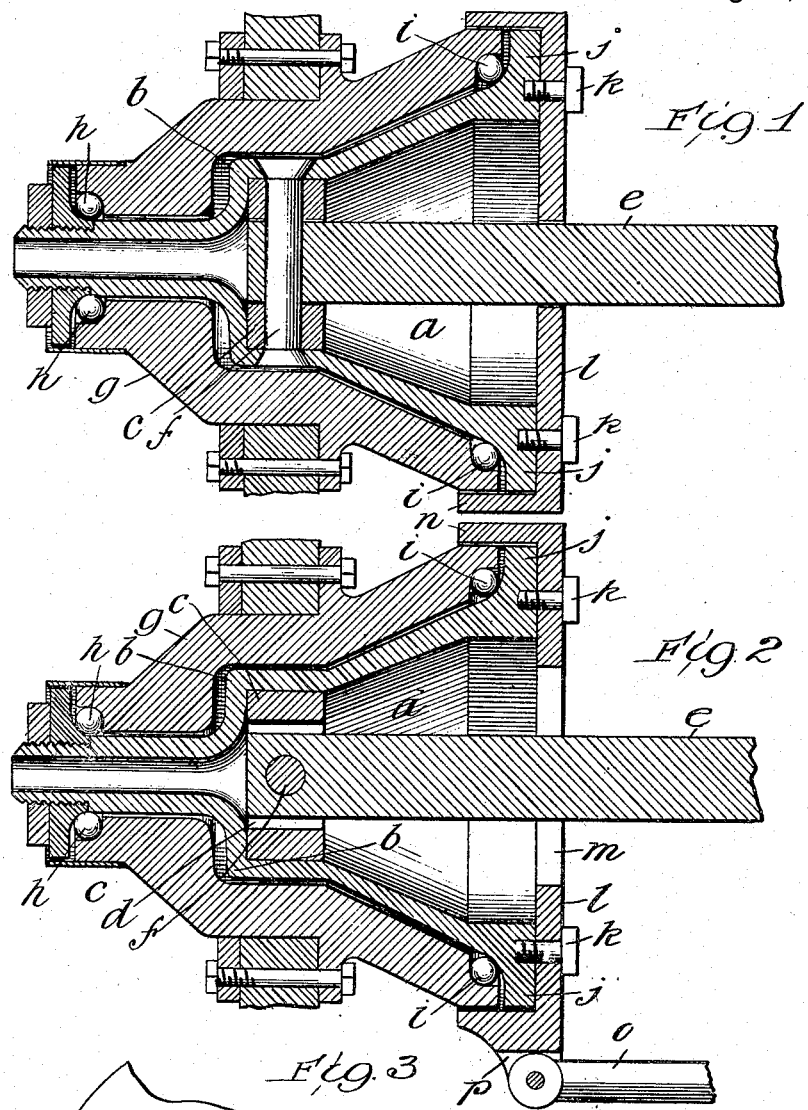

UNITED STATES PATENT OFFICE.

JEAN B. DUMAIS, OF CHICAGO, ILLINOIS, ASSIGNOR OF ONE-FOURTH TO ELMER J. MERCIL AND ONE-FOURTH TO BENONI MERCIL, BOTH OF CHICAGO, ILLINOIS.

STEERING-WHEEL FOR AUTOMOBILES.

No. 930,362.　　　　Specification of Letters Patent.　　　Patented Aug. 10, 1909.

Application filed September 28, 1907. Serial No. 394,971.

*To all whom it may concern:*

Be it known that I, JEAN B. DUMAIS, a citizen of the United States, and a resident of Chicago, in the county of Cook and State of Illinois, have invented certain new and useful Improvements in Steering-Wheels for Automobiles, of which the following is a full, clear, and exact specification.

My invention is concerned with a novel mounting of the steering wheels of automobiles upon the rigid front axle, so that they can be readily turned, as may be necessary in steering vehicles. In these machines, as heretofore constructed, the axle skeins have been pivotally secured to the rigid front axle bar by yoke connections entirely outside of the hub of the wheel, with the result that the strains on the wheels were transmitted to the axle with a leverage that tended to break the pivoted joint, and with the further result that it made it almost impossible to turn the axle skeins of the wheels if the machine was at rest and very difficult to turn them when it was in motion, so that accidents often occurred because the steering gear could not be manipulated quickly enough with the slow moving connections that were necessary to give the required power. To remedy these difficulties, I have made the skeins of a special design that flare near the ends so that they can be pivoted to the ends of the stationary axle bar at a point inside of the skeins, and preferably in the vertical planes of the tires and spokes of the wheels.

To illustrate my invention I annex hereto a sheet of drawings in which the same reference characters are used to designate identical parts, in all the figures of which—

Figure 1 is a vertical section through the axle of a wheel embodying my invention; Fig. 2 is a horizontal section through the wheel; and Fig. 3 is an inner end elevation of the hub of the wheel.

The skein $a$ of the axle may be of any desired design, except that it is practically essential to have the inner end flaring, as shown, and I preferably employ the annular ring seat $b$ in which is fitted and secured a hardened steel bearing ring $c$, the aperture $d$ of which is rectangular in outline to accommodate the end of the axle bar $e$ and to permit the swinging of the skein on the axle bar as is necessary in turning the vehicle. The pivotal connections between the skein and the axle bar are formed by the pin $f$ which passes through a suitable aperture in the end of the axle bar, and which preferably has its ends riveted in the skein to hold the bearing ring $c$ in place. The hub $g$ will be of the necessary shape to coöperate with the skein, and ball or roller bearings $h$ and $i$ of any desired design are preferably employed to reduce the friction. The inner end of the skein $a$ has the enlarged annular flange $j$, and secured upon this flange $j$ in any suitable manner, preferably by a plurality of set screws $k$, is the bearing disk $l$, which has the elongated rectangular slot $m$ therein to accommodate the axle bar $e$ as the skein is swung about it.
The engaging surfaces, if not the entire disk $l$, are hardened, and I preferably provide the outwardly projecting flange $n$ to close the joint and prevent the dust from entering the bearings. The link $o$ which connects the two skeins and which is connected with the steering mechanism in any customary manner, is pivotally secured to the disks $l$, preferably by the ears $p$, which may be formed integrally with said disks.

The mode of operation of my improved apparatus will be readily apparent, as the wheels can be swung on the axle in the same manner as in the ordinary construction with the advantage that the strains are transmitted directly to the ends of the axle bar, and with the further advantage that they do not act with a leverage which tends to break the pivotal connections and also to render it difficult to swing the wheels.

By employing the bearing ring $c$, it will be obvious that the structure is made more practical, especially from a manufacturing standpoint, as it would be difficult to properly machine and harden the bearing surfaces of the aperture $d$ if it were made in the skein itself instead of a separate ring or disk.

While I have shown and described my invention as embodied in the form which I consider the best adapted to carry out the purposes for which it is designed, it is understood that I do not desire to be limited in the interpretation and scope of the claims, except as may be necessitated by the state of the prior art.

What I claim as new, and desire to secure by Letters Patent of the United States is:

1. In a device of the class described, the combination with a stationary axle bar, of skeins having flaring inner ends, plain bearing rings having annular peripheries and rectangular openings secured in the skeins substantially in the plane of the spokes and the tires, bearing pins passing through the ends of the axle bar and secured in the rings, and wheel hubs suitably journaled on said skeins.

2. In a device of the class described, the combination with a stationary axle bar, of skeins having flaring ends, plain bearing rings having annular peripheries and rectangular openings secured in the skeins substantially in the plane of the spokes and the tires, bearing pins passing through the ends of the axle bar and secured in the rings, wheel hubs suitably journaled on said skeins, and caps having horizontal bearing slots through which the axle bar passes, the caps closing the inner ends of the skeins and covering the annular opening between said inner ends of the skeins and the hubs.

In witness whereof, I have hereunto set my hand, and affixed my seal, this 23rd day of September, A. D. 1907.

JEAN B. DUMAIS. [L. S.]

Witnesses:
 JNO. G. ELLIOTT,
 JOHN HOWARD MCELROY.